United States Patent
Gonzalez et al.

(10) Patent No.: US 11,248,530 B2
(45) Date of Patent: Feb. 15, 2022

(54) ACOUSTIC TREATMENT PANEL FOR A TURBOJET ENGINE

(71) Applicant: SAFRAN AIRCRAFT ENGINES, Paris (FR)

(72) Inventors: Jéremy Paul Francisco Gonzalez, Moissy-Cramayel (FR); Norman Bruno André Jodet, Moissy-Cramayel (FR); Georges Jean Xavier Riou, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/046,566

(22) PCT Filed: Apr. 9, 2019

(86) PCT No.: PCT/FR2019/050829
§ 371 (c)(1),
(2) Date: Oct. 9, 2020

(87) PCT Pub. No.: WO2019/197773
PCT Pub. Date: Oct. 17, 2019

(65) Prior Publication Data
US 2021/0131350 A1 May 6, 2021

(30) Foreign Application Priority Data
Apr. 13, 2018 (FR) ...................... 1853240

(51) Int. Cl.
*F02C 7/24* (2006.01)
*G10K 11/16* (2006.01)

(52) U.S. Cl.
CPC ................ *F02C 7/24* (2013.01); *G10K 11/16* (2013.01); *F05D 2220/30* (2013.01)

(58) Field of Classification Search
None
See application file for complete search history.

(56) References Cited

U.S. PATENT DOCUMENTS 4,433,751 A * 2/1984 Bonneau ................. F02K 1/827
181/213
5,014,815 A * 5/1991 Arees ...................... F02K 1/827
181/213

(Continued)

FOREIGN PATENT DOCUMENTS

FR  2962586 A1  1/2012
GB  2019937 A   11/1979

*Primary Examiner* — Michael Lebentritt
(74) *Attorney, Agent, or Firm* — Bookoff McAndrews, PLLC

(57) ABSTRACT

An acoustic treatment panel intended to be disposed on at least one wall of a turbojet engine in contact with a fluid flow, the panel including a first acoustically reflective plate, a second plate and a plurality of cavities mounted between the first plate and the second plate and including a plurality of cells. The second plate is a one-piece plate through which a plurality of channels pass, each opening out on the one hand onto a first orifice formed on a first face of the second plate and on the other hand onto a second orifice formed on a second face of the second plate, the length of each channel extending between its first orifice and its second orifice being greater than the thickness of the second plate.

15 Claims, 4 Drawing Sheets

(56) References Cited

U.S. PATENT DOCUMENTS

| | | | |
|---|---|---|---|
| 6,122,892 A | 9/2000 | Gonidec et al. | |
| 6,827,180 B2* | 12/2004 | Wilson | F02C 7/045 |
| | | | 181/292 |
| 7,540,354 B2* | 6/2009 | Morin | G10K 11/172 |
| | | | 181/292 |
| 7,921,966 B2* | 4/2011 | Chiou | G10K 11/168 |
| | | | 181/292 |
| 7,971,684 B2* | 7/2011 | Gantie | G10K 11/172 |
| | | | 181/292 |
| 8,579,225 B2* | 11/2013 | Mardjono | F02C 7/24 |
| | | | 244/1 N |
| 8,651,233 B2* | 2/2014 | Ayle | B64D 29/00 |
| | | | 181/292 |
| 9,514,734 B1* | 12/2016 | Jones | E04B 1/74 |
| 2003/0141144 A1 | 7/2003 | Wilson | |
| 2010/0206664 A1* | 8/2010 | Bagnall | G10K 11/172 |
| | | | 181/214 |
| 2020/0173362 A1* | 6/2020 | Riou | B32B 3/266 |
| 2021/0122484 A1* | 4/2021 | Jodet | B64D 33/02 |

\* cited by examiner

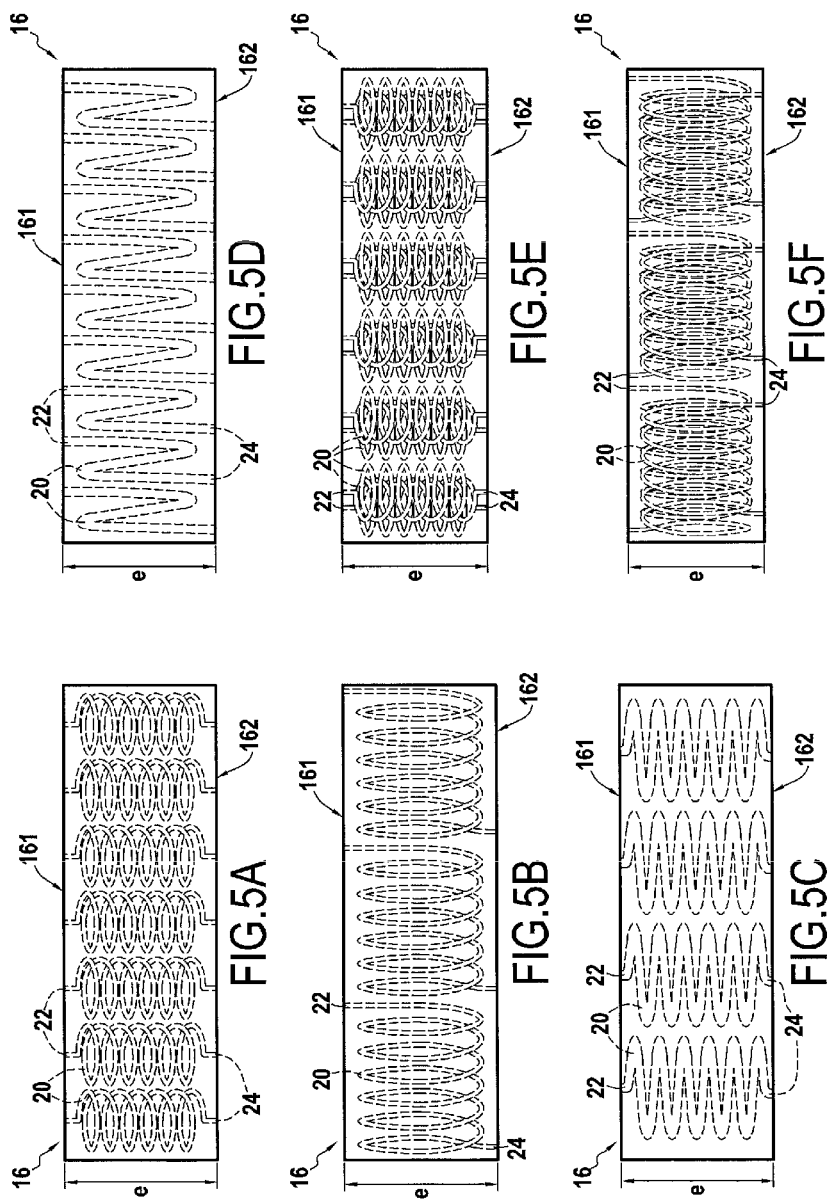

ACOUSTIC TREATMENT PANEL FOR A TURBOJET ENGINE

CROSS-REFERENCE TO RELATED APPLICATION(S)

This application is the U.S. national phase entry under 35 U.S.C. § 371 of International Application No. PCT/FR2019/050829, filed on Apr. 9, 2019, which claims priority to French Patent Application No. 1853240, filed on Apr. 13, 2018.

BACKGROUND OF THE INVENTION

The invention relates to the acoustic propagation of the propulsion systems using ducted turbomachines and, more particularly, to an acoustic treatment technology for attenuating the noise radiated by the interaction between one or several rotor(s) and its environment.

Conventionally, the acoustic treatment of a turbojet engine, and more specifically of the noise radiated by the interaction between the rotor and its environment, is carried out using absorbent panels disposed at the wetted surfaces of the duct in which the sound waves propagate. It is meant by "wetted surfaces" the surfaces in contact with a fluid flow. These panels are sandwich-type composite materials trapping a honeycomb, whose absorbent properties are partly obtained thanks to the principle of Helmholtz resonators.

A Helmholtz resonator consists of a resonant cavity and one or several neck(s) extending inside the cavity each from an orifice formed in a wall and allowing the resonant cavity to communicate with the surrounding medium in which the waves to be attenuated propagate. The neck thus ensures the communication between the surrounding medium and the internal air cavity. Once the device is optimized, the neck ensures a visco-thermal dissipation effect, which corresponds to a rapid and alternating movement of the sound waves through the ends of the neck causing frictional dissipation.

In the conventional treatment technologies, the length of the neck is small compared to the height of the cavity. More specifically, in the conventional technologies, the length of the neck is equal to the thickness of a wall made of composite sheet metal (carbon+resin) which constitutes the wetted surface of the treatment, because the neck is obtained by simple perforation of this wall. The operation of the Helmholtz resonator is optimized by dimensioning the air cavity so as to obtain the maximum acoustic speed at the neck. This optimization requires cavity heights on the order of one quarter of the wavelength of the main frequency to be treated. It also provides very interesting properties as to the significant frequency bandwidth covered.

However, current trends for the optimization of the propulsion systems are centered on decreasing the numbers of blades and reducing the speed of rotation of the rotating assemblies such as the fan. This results in a lowering of the frequencies of the acoustic radiation.

The optimization of the treatment panels then requires the increase of their thickness in order to be able to increase the height of the cavity and thus decrease the tuning frequency of the resonant cavities of the panels. This makes the panels incompatible with the constraints of mass and space requirement associated with the new UHBR (Ultra High Bypass Ratio) type architectures.

It is always possible to dimension the Helmholtz resonator so that it is effective at lower frequencies, for a reduced radial space requirement, for example, by adjusting both the height of the neck and the volume of the resonant cavity.

The counterpart, for this type of dimensioning under the constraint of a given reduced space requirement, is that the frequency band on which the treatment operates in an optimal manner is drastically reduced when the frequency decreases as illustrated in FIG. 1 which presents an acoustic attenuation curve showing the treatment effectiveness as a function of the frequency for a conventional Helmholtz resonator in solid lines and a Helmholtz resonator whose dimensions have been reduced according to the state of the art in dotted lines.

The results derived from measurements, presented in FIG. 2 in the form of absorption coefficients, illustrate the low-frequency performance centered at 550 Hz of a large-neck structure whose overall thickness is of 26 mm, for a sound level of 140 dB, whose measurements are represented by the white squares, and for a sound level of 156 dB, whose measurements are represented by the black squares, compared to a conventional resonator based on much thicker perforated metal, whose curve appears in solid line, this resonator requiring the implementation of a 150 mm cavity for equivalent performance in this range of frequencies.

This restriction on the attenuation frequency bandwidth is very penalizing, because the variation of the fan speed according to the flight phases generates significant changes in its sound emission frequency. As a result, the treatment dimensioned in this way will be effective only for a single speed, and for a frequency range that cannot go down very low in frequency.

Acoustic treatment panels are known comprising a machined carbon sheet metal with oblong orifices serving only to protect a thin cloth defining necks perpendicular to the sheet metal (to be confirmed).

Systems for perforating plates are also known to form perforated plates for acoustic treatment panels.

Acoustic treatment panels are also known comprising resonators provided with adjustable necks at least at two different frequencies mounted on perforated plates and extending inside cavities formed for example by cells of a honeycomb structure.

In addition, acoustic treatment panels are known comprising a porous input layer provided with single channels and formed by assembling at least two distinct plates which can cause acoustic leaks at the interfaces.

OBJECT AND SUMMARY OF THE INVENTION

The invention aims at providing an acoustic treatment panel making it possible to overcome the drawbacks mentioned above and including in particular resonators capable of attenuating the radiation associated with the noise of the low-frequency lines effectively on at least one turbomachine speed for a greatly reduced space requirement compared to a conventional honeycomb-type treatment and while retaining the conventional processes of developing the honeycomb treatments and while reducing the acoustic leaks.

An object of the invention proposes an acoustic treatment, in particular attenuation, panel intended to be disposed on at least one wall of a turbojet engine in contact with a fluid flow, the panel comprising a first acoustically reflective plate, a second plate having a first face intended to be in contact with a fluid flow and a second face opposite the first plate, and a plurality of cavities mounted between said first plate and the second face of the second plate, the cavities opening out onto the first plate on the one hand and onto the second face of the second plate on the other hand, and the second plate having a thickness extending between the first and second faces in a direction orthogonal to said first and second faces.

According to a general characteristic of the invention, the second plate is a one-piece plate through which a plurality of channels pass, each opening out on the one hand onto a first orifice formed on the first face, and on the other hand onto a second orifice formed on the second face, the length of each channel extending between its first orifice and its second orifice being greater than the thickness of said second plate.

The use of a one-piece plate allows avoiding leaks related in particular to the interfaces in the case of a multi-piece plate.

According to a first embodiment of the acoustic treatment panel, the second plate comprising the channels can be a plate generated by three-dimensional additive manufacturing.

The production of the second one-piece plate by additive manufacturing allows designing channels with complex geometries making it possible to lengthen the channels. This ability to lengthen the channels in the second plate provided by the complex geometries allows attenuating lower frequencies without increasing the thickness of the second plate and/or the thickness of the panel.

According to a second embodiment of the acoustic treatment panel, the channels may each have a length in the direction in which the channel extends in the second plate greater than the largest dimension of the first orifice of the channel.

According to a third embodiment of the acoustic treatment panel, the section of the channels can be comprised between 0.2 mm$^2$ and 7 mm$^2$.

According to a fourth embodiment of the acoustic treatment panel, at least one cavity can open out onto a plurality of channels of the second plate.

According to a fifth embodiment of the acoustic treatment panel, the ratio between the length of the channels of the second plate and the thickness of the second plate is preferably greater than or equal to 1.5.

According to a sixth embodiment of the acoustic treatment panel, the second plate can have a homogeneous distribution of the channels in the plane in which the second plate extends.

It is meant by "homogeneous distribution of the channels in the plane in which the second plate extends" a distribution for which the distance between each first orifice on the first face is substantially on the same order of magnitude and the distance between each second orifice on the second face is substantially on the same order of magnitude.

According to a seventh embodiment of the acoustic treatment panel, the second plate may have a distribution gradient of the channels in the plane in which the second plate extends.

It is meant by "distribution gradient of the channels in the plane in which the second plate extends", a distribution for which the distance between the orifices can vary depending on the different areas of the second plate. Such a configuration allows varying the distance between the channels and thus varying the volume available for the channels, and thus varying the length of the channels depending on the different areas, in a plate of constant thickness and thus optimizing the treatment on different frequencies.

Furthermore, using the additive manufacturing with a distribution gradient does not vary the cost of production for this type of more complex implementation.

According to an eighth embodiment of the acoustic treatment panel, each channel may have a first and a second end portion respectively in contact with the first and second orifices, each of the first and second end portions extending in a direction forming an angle of at most 15° with a straight line orthogonal respectively to the first or the second face of the second plate onto which it opens out.

Each channel may have a first and a second end portion respectively in contact with the first and second orifices, each of the first and second end portions extending in a direction forming an angle of at least 15° with respectively the first or the second face of the second plate onto which it opens out.

The angle of at least 15° formed by an end portion of the channel with the face of the second plate onto which it opens out promotes the permeability of the second plate to acoustic waves, in particular at the inlet in the panel, and improves the operation of the cavities at the outlet of the second plate.

According to a ninth embodiment of the acoustic treatment panel, each channel can have a radius of curvature of a minimum of 1 mm applied over its entire length The radius of curvature of the channels promotes the permeability of the second plate to acoustic waves.

The angle of at least 15° and the radius of curvature of at least 1 mm allow the wave to enter and exit the channel.

In the case where the angle is smaller than 15° and/or the radius of curvature is less than 1 mm, the wave arriving on the plate or moving in the channel will have these two characteristics as an "impenetrable wall" and will therefore be reflected. These characteristics allow having an increased permeability compared to the case where the wave is reflected.

According to a tenth embodiment of the acoustic treatment panel, the distance separating the first plate from the second plate is preferably greater than or equal to one quarter of the length of the longest channel of the second plate.

According to an eleventh embodiment of the acoustic treatment panel, the channels of the second plate are preferably separated by a distance greater than or equal to the dimension of the largest orifice of the second plate.

According to a twelfth embodiment of the acoustic treatment panel, the channels can have a three-dimensional geometry.

Shapes contained in a plane are considered to be simple shapes, the third dimension being the thickness of the channel. It is then referred to as two-dimensional shapes. The three-dimensional shapes moving in all directions are complex shapes. The advantage of the three-dimensional shapes is to optimize the dimensioning of the channels by maximizing the space they occupy in the volume of the second plate.

Another object of the invention proposes a turbojet engine comprising at least one acoustic treatment panel as defined above.

Yet another object of the invention proposes an aircraft comprising at least one turbojet engine as defined above.

BRIEF DESCRIPTION OF THE DRAWINGS

The invention will be better understood upon reading the following, by way of indication but without limitation, with reference to the appended drawings in which:

FIGS. 5A to 5F schematically represent exemplary embodiments of the channels of the acoustic treatment panel;

DETAILED DESCRIPTION OF EMBODIMENTS

Figure 1:
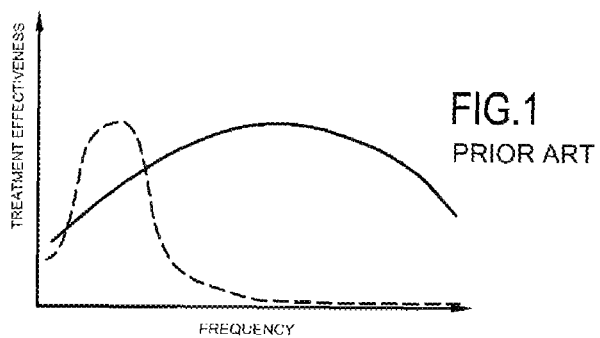
FIG. 1, already described, represents an acoustic attenuation curve showing the treatment effectiveness as a function of the frequency of the sound wave for two different cells according to the state of the art.
Figure 2:
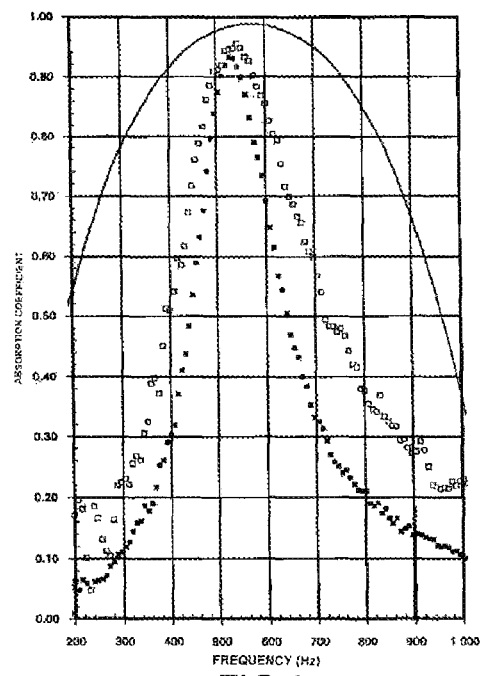
FIG. 2, already described, presents a graph representing the change in the absorption coefficient as a function of the frequency of the sound wave for three different cells according to the state of the art.
Figure 3:
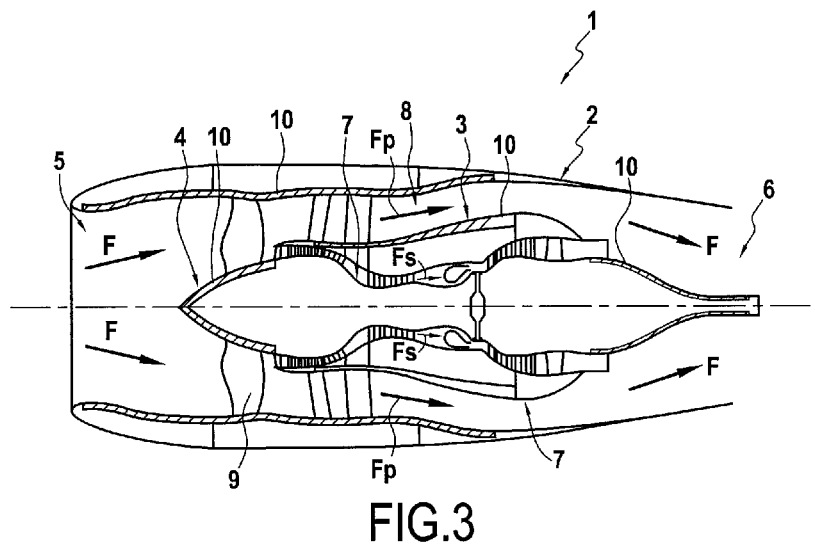
FIG. 3 presents a sectional view of a turbojet engine according to one embodiment of the invention, in a longitudinal plane of the turbojet engine.

FIG. 3 represents a sectional view of a turbojet engine 1 according to one embodiment of the invention, in a longitudinal plane of the turbojet engine 1.

The turbojet engine 1 comprises a nacelle 2, an intermediate casing 3 and an internal casing 4. The nacelle 2 and the two casings 3 and 4 are coaxial. The nacelle 2 defines at a first end an inlet channel 5 for a fluid flow and at a second end, opposite the first end, an exhaust channel 6 for a fluid flow. The nacelle 2 and the intermediate casing 3 delimit therebetween a primary fluid flowpath 7. The intermediate card 3 and the internal casing 4 delimit therebetween a secondary fluid flowpath 8. The primary flowpath 7 and the secondary flowpath 8 are disposed along an axial direction of the turbojet engine between the inlet channel 5 and the exhaust channel 6.

The turbojet engine 1 further comprises a fan 9 configured to deliver an air stream F as a fluid flow, the air stream F being divided at the outlet of the fan into a primary stream $F_P$ circulating in the primary flowpath 7 and into a secondary stream $F_S$ circulating in the secondary flowpath 8.

The turbojet engine 1 further comprises at least one acoustic treatment panel 10 configured to attenuate the acoustic waves emitted by the turbojet engine before these waves escape, radially, outside the nacelle 2 of the turbojet engine 1.

Each acoustic treatment panel 10 is configured to attenuate acoustic waves whose frequency belongs to a predetermined range of frequencies. In the embodiment illustrated in FIG. 3, the acoustic treatment panels 10 are integrated to the nacelle 2, to the intermediate casing 3 and to the internal casing 4. On the internal casing 4, the acoustic treatment panels 10 are integrated, on the one hand, onto the portion upstream the intermediate casing 3 along the axial direction and in particular onto the portion carrying the fan 9 and, on the other hand, onto a portion downstream of the intermediate casing 3.

Figure 4:
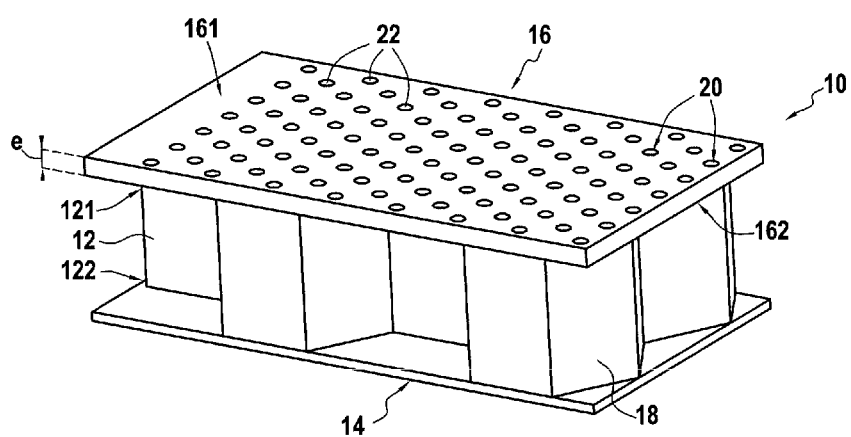
FIG. 4 illustrates a partial perspective view of an acoustic treatment panel according to one embodiment of the invention.

FIG. 4 represents a partial perspective view of an acoustic treatment panel 10 according to one embodiment of the invention.

Referring to FIG. 4, the acoustic treatment panel 10 includes a core 12, a reflective layer 14 and an input layer 16.

The core 12 has a honeycomb structure. More specifically, the core 12 includes a plurality of cells 18 arranged in a known honeycomb structure.

Each cell 18 opens out onto a first face 121 of the core 12 and onto a second face 122 of the core 18 located opposite the first face 121.

The first face 121 of the core 12 is intended to be oriented towards the primary 7 or secondary 8 air flowpath depending on the location of the acoustic treatment panel 10. The second face 122 of the core 12 is intended to be facing away the air flowpath.

Preferably, the core 12 is such that the distance between the first face 121 and the second face 122 is on the order of a quarter of the wavelength corresponding to a predetermined working frequency.

The working frequency is a frequency for which a maximum acoustic attenuation is desired. The working frequency belongs to the predetermined range of frequencies.

According to the embodiment, the core 12 can be made of metal or of a composite material such as a composite material formed of carbon fibers embedded in a cured resin matrix.

The reflective layer 14 is adapted to reflect acoustic waves having a frequency belonging to the predetermined range of frequencies.

The reflective layer 14 extends opposite the second face 122 of the core 12, being in contact with the second face 122. More specifically, the reflective layer 14 is secured to the second face 122 of the core 12, for example bonded to the second face 122 of the core 12.

According to the embodiment, the reflective layer 14 can be made of metal or of a composite material, such as a composite material formed of carbon fibers embedded in a cured resin matrix.

The input layer 16 extends opposite the first face 121 of the core 12, being in contact with the first face 121. More specifically, the input layer 16 is secured to the first face 121 of the core 12, for example bonded to the first face 121 of the core 12.

The input layer 16 is a one-piece plate formed by additive manufacturing. It comprises a plurality of channels 20 passing through the input layer 16 from a first opening 22 made on the first face 161 of the input layer 16 up to a second opening 24 made on the second face 162 of the input layer 16. The second opening 24 of each channel 20 opens out onto a cell 18 of the core 12, several channels 20 being able to open out onto the same cell 18.

In order to increase the length of the channels 20 and thereby decrease the frequencies of the sound waves which can be treated by the acoustic treatment panel 10, the channels 20 extend into the input layer 16 so as to have a length greater than the thickness e of the input layer 16, the thickness e of the input layer corresponding to the distance separating the first face 161 from the second face 162 of the input layer measured in a direction orthogonal to the planes in which the two faces 161 and 162 of the input layer 16 extend.

The channels 20 can have simple or, preferably, complex shapes. The complex three-dimensional shapes allow optimizing the dimensioning of the necks by maximizing the space they occupy in the volume of the input layer 16.

The channels, simple or complex, have preferably lengths greater than 1.5 times the thickness e of the input layer 16.

FIGS. 5A to 5F schematically represent exemplary embodiments of the channels of the acoustic treatment panel 10.

FIG. 5A presents an input layer 16 with channels 20 having a helical shape oriented along the thickness e of the input layer 16. The path of the channel 20 corresponds to a helicoid that winds about an axis oriented along the thickness e of the input layer 16.

FIG. 5B presents an input layer 16 with channels 20 having a helical shape oriented perpendicular to the thickness e of the input layer 16. The path of the channel 20 corresponds to a helicoid that winds about an axis oriented perpendicular to the thickness e of the input layer 16.

FIG. 5C presents an input layer 16 with serpentine-shaped channels 20 oriented along the thickness e of the input layer 16. A serpentine has a plurality of layers and extends generally in the same plane. The path of the channel 20 corresponds to a serpentine whose greatest length is oriented along the thickness e of the input layer 16.

FIG. 5D presents an input layer 16 with channels 20 having the shape of a serpentine oriented perpendicular to the thickness e of the input layer 16. The path of the channel 20 corresponds to a serpentine whose greatest length is oriented perpendicular to the thickness e of the input layer 16.

FIG. 5E presents an input layer 16 with channels 20 having a double-helicoid configuration. Two adjacent channels wind in a double helicoid whose axis is oriented along the thickness e of the input layer 16. The path of each channel 20 corresponds to a helicoid that winds about an axis oriented along the thickness e of the input layer 16. This type of configuration, in combination of several channels, can have the advantage of minimizing the curvatures of the channel, and therefore the acoustic resistivity thereof.

FIG. 5F presents an input layer 16 with two adjacent channels winding in a double helicoid whose axis is oriented perpendicular to the thickness e of the input layer 16. The path of each channel 20 corresponds to a helicoid that winds about an axis oriented perpendicular to the thickness e of the input layer 16.

It is also possible to envisage a multi-helicoidal configuration with several neighboring channels winding along a helicoid of common axis, oriented along the thickness e of the input layer or perpendicular thereto.

Any other overlay of regular patterns can also be envisaged.

Technologies such as three-dimensional printing on a powder bed or by depositing material can be envisaged to design the input layer. It is enough to be able to achieve a certain accuracy, on the order of 0.1 mm minimum.

This optimization allows tuning the treatment to lower frequencies without significantly increasing the total height of the treatment and by retaining the conventional processes of developing the honeycomb treatments.

Preferably, the frequency tuning of the acoustic treatment panel 10 satisfies, as a first approximation, the following equation:

$$F = \frac{C}{2\pi}\sqrt{\frac{S}{Vl'}}$$

With F the tuning frequency in Hertz, C the velocity of the sound in meters per second, S the section of the channel in square meters, V the volume of the resonator in meters, l' the corrected channel length, where $$l' = l + \delta$$

with l the geometric length of the channel, and δ the correction of the channel where $$\delta = 1.7r(1 - 0.7\sqrt{\sigma})$$

for juxtaposed resonators, with r the radius of an orifice, and σ the perforation rate.

Preferably, the length of the channel is greater than its diameter, at least 1.5 times greater, to guarantee the desired properties to the air column it contains. The distance between the second opening 24 of the channels 20, in other words, the second face 162 of the input layer, and the reflective layer 14 is greater than a quarter of the height of the channel. The section of the channel is comprised between 0.2 mm² and 7 mm². A single cavity can contain several necks. The spacing between each neck should be greater than a neck diameter.

Figure 6:
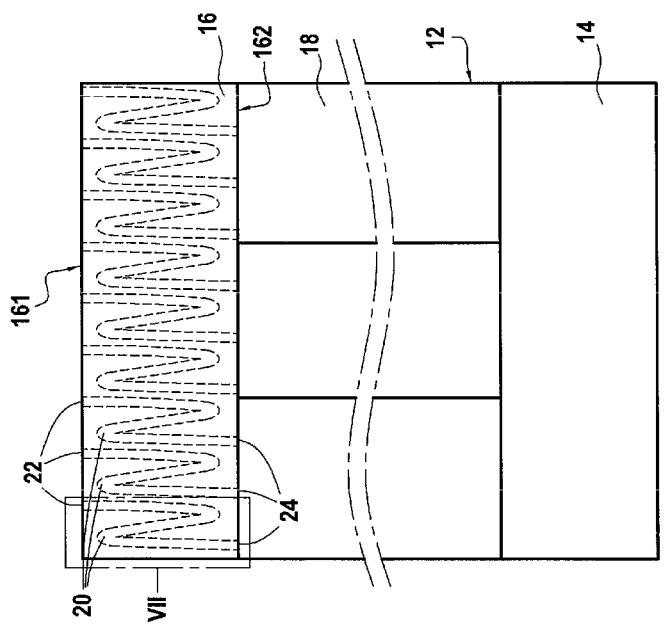
FIG. 6 presents schematically a sectional view of the acoustic treatment panel of FIG. 4.

As illustrated in FIG. 6 which schematically presents a sectional view of the acoustic treatment panel of FIG. 4, each cavity 18 of the core 12 opens out onto a plurality of channels 20 of the input layer 16. In other words, several channels 20 of the input layer 16 open out onto the same cavity 18 of the core 12.

Figure 7:
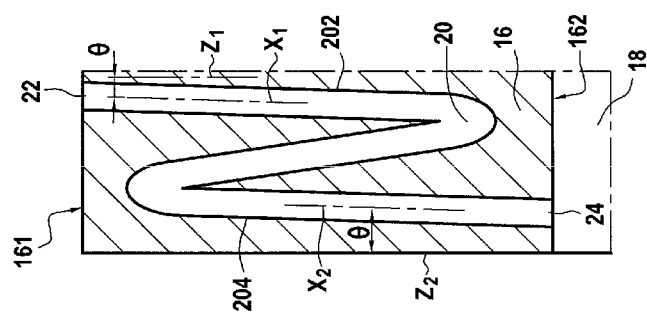
FIG. 7 presents schematically a zoom of a portion of a channel of the acoustic treatment panel of FIG. 4.

Furthermore, as illustrated in FIG. 7 which schematically presents a zoom of a portion of a channel of the acoustic treatment panel of FIG. 4, each channel 20 preferably has a first end portion 202 extending from the first opening 22 and a second end portion 204 extending from the second opening 24. Each of the first and second end portions 202 and 204 extends within the thickness of the input layer 16, from respectively the first and second openings 22 and 24, in a direction, respectively $X_1$ and $X_2$, forming an angle θ of at most 15° with a straight line, respectively $Z_1$ and $Z_2$, orthogonal to the plane in which the input layer 16 extends.

In other words, each of the first and second end portions 202 and 204 extends in a direction forming an angle comprised between 75° and 90° with the face of the input layer 16 onto which it opens out, namely respectively the first face 161 and the second face 162. This angle promotes permeability of the input layer 16 to acoustic waves, in particular at the inlet in the panel 10, and improves the operation of the cavities 18 at the outlet of the input layer 16.

The invention thus provides an acoustic treatment panel making it possible to overcome the drawbacks mentioned above and including in particular resonators capable of attenuating the radiation associated with the noise of the low-frequency lines effectively on a turbomachine speed for a greatly reduced space requirement compared to a conventional honeycomb-type treatment and while retaining the conventional processes of developing the honeycomb treatments.

The invention claimed is:

1. An acoustic treatment panel intended to be disposed on at least one wall of a turbojet engine in contact with a fluid flow, the panel comprising a first plate, a second plate having a first face (161) intended to be in contact with a fluid flow and a second face (162) opposite the first plate, and a plurality of cavities mounted between said first plate and the second face of the second plate, the cavities opening out onto the first plate on the one hand and onto the second face of the second plate on the other hand, and the second plate having a thickness extending between the first and second faces in a direction orthogonal to said first and second faces, characterized in that the second plate is a one-piece plate through which a plurality of channels pass, each opening out substantially perpendicularly, on the one hand, onto a first orifice formed on the first face and on the other hand onto a second orifice formed on the second face, the length of each channel extending between its first orifice and its second orifice being greater than or equal to 1.5 times the thickness of said second plate.

2. The panel according to claim 1, wherein the channels are oriented along the thickness or perpendicular to the thickness of said second plate.

3. The panel according to claim 1, wherein the section of the channels comprised between 0.2 mm$^2$ and 7 mm$^2$.

4. The panel according to claim 1, wherein at least one cavity opens out onto a plurality of channels of the second plate.

5. The panel according to claim 1, wherein the second plate has a homogeneous distribution of the channels the plane in which the second plate extends.

6. The panel according to claim 1, wherein the second plate has a distribution gradient of the channels in the plane in which the second plate extends.

7. The panel according to claim 1, wherein each channel has a first and a second end portion respectively in contact with the first and second orifices, each of the first and second end portions extending in a direction forming an angle at least 15° respectively with the first or second face of the second plate onto which it opens out.

8. The panel according to claim 1, wherein each channel has a radius of curvature of a minimum of 1 mm applied over its entire length.

9. The panel according to claim 1, wherein the distance separating the first plate from the second plate is greater than or equal to one quarter of the length of the longest channel of the second plate.

10. The panel according to claim 1, wherein the channels the second plate are separated by a distance greater than or equal to the dimension of the largest orifice of the second plate.

11. The panel according to claim 1, wherein the channels have a complex serpentine, helicoid, double-helicoid or multi-helicoid shaped three-dimensional geometry.

12. The panel according to claim 1, wherein the first plate is an acoustically reflective layer.

13. A method for manufacturing an acoustic treatment panel according to claim 1, wherein the second plates comprising the channels a plate generated by three-dimensional additive manufacturing.

14. A turbojet engine comprising at least one acoustic treatment panel according to claim 1.

15. An aircraft comprising at least one turbojet engine according to claim 14.

\* \* \* \* \*